United States Patent [19]

Clark, Jr.

[11] 4,308,576
[45] Dec. 29, 1981

[54] OVERLOAD PROTECTION FOR A VOLTAGE CONVERSION CIRCUIT

[75] Inventor: Charles A. Clark, Jr., Chatsworth, Calif.

[73] Assignee: Sperry Corporation, New York, N.Y.

[21] Appl. No.: 136,031

[22] Filed: Mar. 31, 1980

[51] Int. Cl.³ .............................................. H02M 3/53
[52] U.S. Cl. ...................................... 363/56; 323/285
[58] Field of Search ...................... 363/25, 26, 56, 124, 363/134; 323/266, 282, 283, 285

[56] References Cited

U.S. PATENT DOCUMENTS 3,769,568 10/1973 Hamilton et al. ...................... 363/25
4,251,857 2/1981 Shelly ..................................... 363/26

Primary Examiner—J. D. Miller
Assistant Examiner—John W. Redman
Attorney, Agent, or Firm—Howard P. Terry

[57] ABSTRACT

A voltage converter of the transformer type which incorporates at least one switching transistor coupled to control the application of current to the transformer primary and circuitry for switching the transistor on and off to control the current through the primary winding. When the output of the converter is shorted, the switching rate undesirably increases causing potential damage to the converter. A frequency detecting circuit detects the increase in switching frequency and acts to reduce the input voltage to the converter to prevent damage thereto.

5 Claims, 2 Drawing Figures

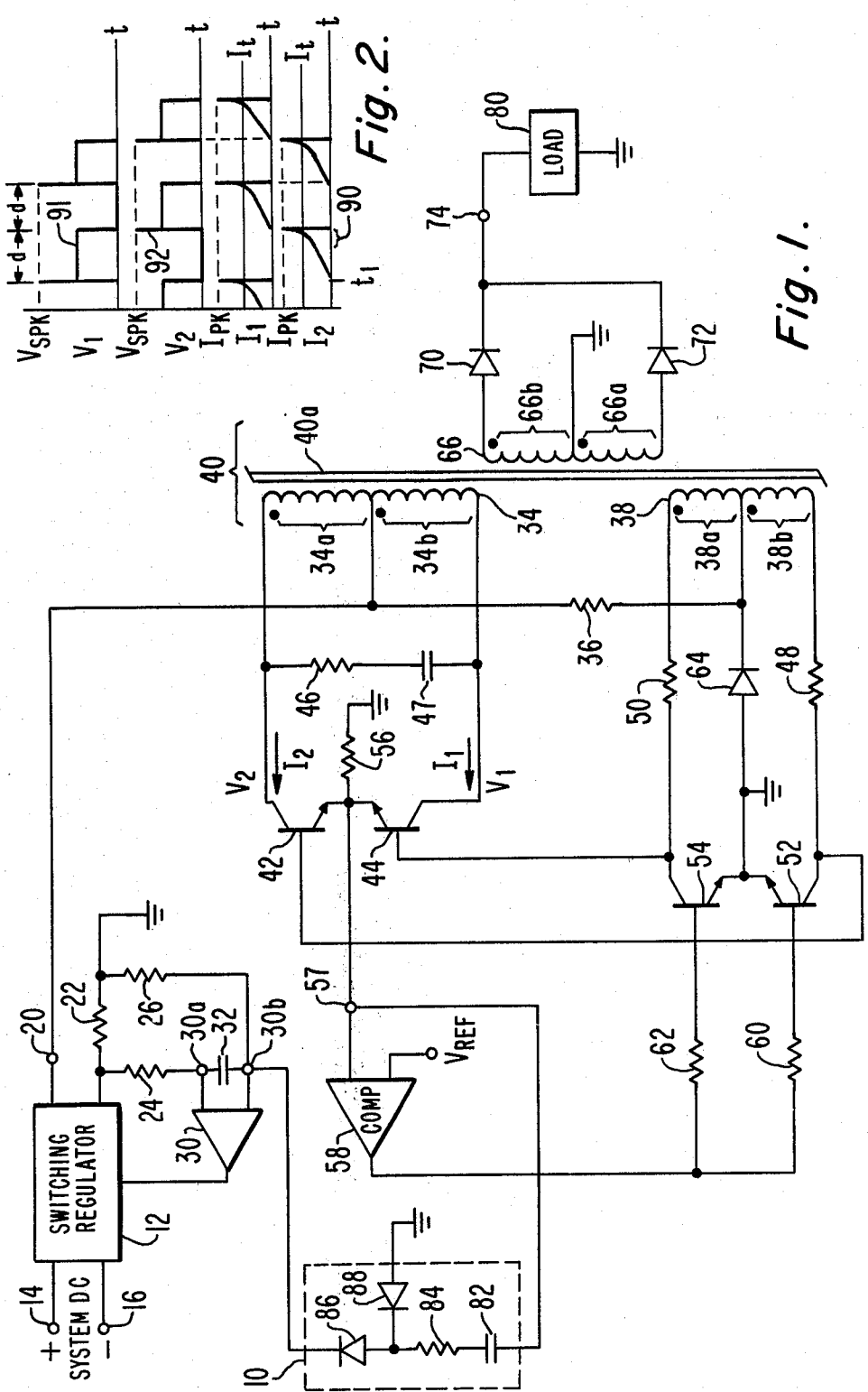

OVERLOAD PROTECTION FOR A VOLTAGE CONVERSION CIRCUIT

This invention relates to voltage conversion circuits and more particularly to protecting such circuits from damage due to overload.

It is known to utilize a transformer in a voltage converter receiving a direct current (DC) voltage. Such a transformer comprises a primary winding, appropriate secondary windings and, depending on the type of converter, an auxiliary primary winding. One or more switching transistors are coupled to the primary winding. The switching transistor or transistors are switched on by control signals from the auxiliary winding or from some other source to switch an input voltage to the primary winding. The transistors are subject to burn out upon turn off due to the voltage spikes produced by the primary windings. The voltage spikes are a function of current in the primary winding leakage reactance. It is know to prevent transistor burn out by employing a current threshold circuit to detect the primary winding current and to shut off the switching transistor before excess current occurs. A voltage converter of the type described additionally typically employs an overcurrent sensor on the primary side of the transformer to cut off voltage to the switching transistors and thus to the transformer primary winding upon detection of a predetermined overcurrent.

When the secondary winding of such a converter is shorted out, ideally the short is reflected to the primary windings and thus to the overcurrent protection circuit which shuts down the circuit. However, due to transformer winding resistance, imperfect coupling of the transformer and other factors, such short is not reflected back to the overcurrent circuit. Rather, the current threshold circuit sensing the increase in primary current begins to switch back and forth between the switching transistors at a very high rate, resulting in excessive amount of power being dissipated in the switching transistors and transformer primary.

In accordance with a preferred embodiment of the invention, which incorporates a voltage converter receptive of a DC voltage and employing a transformer and a switching means coupled to the transformer, a frequency responsive means is coupled to the switching means for determining the switching frequency. The frequency responsive means is responsive to a frequency in excess of a given rate for decreasing the input voltage to the transformer primary winding.

In the drawing:

FIG. 1 is a DC-to-DC converter in schematic and block form in accordance with a preferred embodiment of the invention; and FIG. 2 is a set of waveforms useful in understanding the operation of the converter of FIG. 1.

Referring to FIG. 1 a DC-to-DC converter according to one embodiment of the invention is illustrated. Except for the addition of the components and circuitry in dashed block 10 and the connection thereof, this converter is like that of a conventional DC-to-DC converter. A switching regulator 12 of conventional design is receptive of system DC at terminals 14 and 16 from a source not shown. In an aircraft, system DC might be produced by power generating equipment on board the aircraft and might have considerable current ripple and be of poor regulation.

Switching regulator 12 produces, at terminal 20 relative to circuit ground, a relatively well regulator and relatively ripple free DC voltage. A current sensing resistor 22 is coupled between regulator 12 and circuit ground. A pair of voltage limiting resistors 24 and 26 are connected between the ends of resistor 22 and an overcurrent sensing device 30 at input terminals 30a and 30b which may be a standard voltage comparator. A signal smoothing capacitor 32 is connected between terminals 30a and 30b and with resistors 24 and 26 comprises a low pass filter to smooth the ripple produced by operation of the FIG. 1 DC-to-DC converter to prevent converter switching noise from causing device 30 to produce false overcurrent signals. It should be noted that comparator 30 is normally considered to be part of switching regulator 12 but is shown external thereto in FIG. 1 for the sake of drawing clarity.

The output of device 30 is coupled to switching regulator 12. When the current drawn from switching regulator 12 at terminal 20 exceeds a preselected value and thus the voltage drop across resistor 22 exceeds a preselected voltage, the difference in voltage at terminals 30a and 30b is such that the device 30 produces a signal to disable regulator 12 or otherwise to limit or cut "off" the current at terminal 20.

Terminal 20 is coupled to the center tap of a center tapped primary winding 34 and via resistor 36 to the center tap of an auxiliary or feedback center tapped winding 38 of a saturable core transformer 40. The ends of winding 34 are coupled to a switching means comprising respective collectors of NPN switching transistors 42 and 44. A spike supression network comprising a series connected resistor 46 and capacitor 47 is coupled between the ends of winding 34.

The ends of auxiliary ("feedback" or "base drive") winding 38 are coupled via respective resistors 48 and 50 to respective collectors of NPN transistors 52 and 54 and to the base of transistors 42 and 44. The emitters of transistors 42 and 44 are connected in common through a current sensing resistor 56 of about one ohm to system ground and at terminal 57 to an input of comparator 58. A second input to comparator 58 is a reference potential of preselected value $V_{REF}$. The output of comparator 58 is coupled via respective base resistors 60 and 62 to the bases of transistors 52 and 54 respectively. The emitters of transistors 52 and 54 are connected to circuit ground. A diode 64 known conventionally as a "diode start" at its anode is connected to circuit ground and at its cathode is connected to the center tap of transformer winding 38.

Transformer 40 has a center tapped secondary winding 66. The transformer may have other secondary windings or winding taps (not shown) to produce a plurality of values of voltages. The ends of winding 66 are coupled to a fullwave rectifier comprising rectifier diodes 70, 72 which are coupled at terminal 74 to a suitable load 80. The load and center tap of secondary winding 66 are connected to circuit ground. The value of voltage applied at terminals 14–16, the parameters of switching regulator 12 and transformer 40 windings are selected to provide the desired DC voltage at terminal 74. Some or all the secondary windings (not shown) may be coupled to suitable loads (not shown) without being rectified.

The description to this point is of a conventional saturable core DC-to-DC converter. In accordance with the invention, additional circuitry illustrated in block 10 is coupled between terminals 57 and 30b to sense the frequency at which transistors 42 and 44 are switched. The additional circuit comprises a series connection of a capacitor 82, a resistor 84 forming an RC high pass network, a rectifier diode 86 and a clamp diode 88 connected between circuit ground at its anode and the juncture of resistor 84 and diode 86 at its cathode. Capacitor 82 is connected to terminal 57 while the cathode of diode 86 is connected to terminal 30b.

Operation of the circuit of FIG. 1, excluding the operation of the frequency sensing means of block 10 and the operation of the threshold circuit comprising components 52, 54 and 58 will now be described with reference as needed to FIG. 2. FIG. 2 illustrates collector voltages and currents of transistors 42 and 44. Assume arbitrarily that transistor 42 has just become conductive in saturation and transistor 44 has just become nonconductive as illustrated at time $t_1$, FIG. 2. Therefore, ignoring the voltage drops across resistor 56 and transistor 42, the voltage between the terminal 20 and circuit ground appears across the winding 34a. Therefore, current flows in primary winding 34a and due to transformer coupling, in auxiliary winding 38a and secondary winding 66.

As the current rises in winding 34a as illustrated in FIG. 2, waveform $I_2$, portion 90, the transformer core approaches saturation. Moreover, a voltage equal to that across winding 34a also appears across winding 34b as illustrated in FIG. 2, waveform $V_1$, portion 91. That is, the voltage of the collector of transistor 44 is substantially twice the voltage of terminal 20 relative to circuit ground. Therefore as the transformer core approaches saturation, the transformer inductance decreases abruptly and the field collapses in transformer core 40a causing a loss of drive current to transistor 42 which therefore becomes nonconductive. Simultaneously, the transformer tries to maintain the primary current by reversing polarity. The polarity reversal is manifested as a positively directed signal in winding 38a which, being coupled to transistor 44, causes it to become conductive and in saturation and the process above described is repeated.

When transistor 42 turns off, a large voltage spike (FIG. 2 waveform $V_2$, spike 92) of potential $V_{SPK}$ appears across the collector and emitter of transistor 42 due to the transformer trying to maintain constant current in its primary leakage reactance in the absence of any circuit path except for stray capacitance and collector-to-base capacitance in transistor 42. In the obsence of resistor 46, and capacitor 47 network, the voltage spike would damage the transistor. The capacitance value can be made sufficiently large and the resistance value made sufficiently small to prevent transistor damage. The network however, then dissipates an undesirably large amount of power. With the circuit to be described below peak current in transistors 42 and 44 is reduced as are the voltage spikes so that the values of capacitor 47 and resistor 46 can be selected so as to dissipate appreciably less power than would otherwise be required.

To prevent current build up to such a high level in transistors 42 or 44, a threshold circuit comprising components 52, 54, 56 and 58 is utilized to switch "off" the one of transistors 42 and 44 which is "on" when the current in that transistor reaches a preselected value $I_t$ as illustrated in FIG. 2, waveforms $I_1$ or $I_2$.

The current passing through transistor 42 (or transistor 44) also passes through resistor 56 which produces at terminal 57, a voltage proportional to the current passing through resistor 56. Thus, if it is desired to shut "off" transistor 42, (or transistor 44) when current $I_t$ is passing through the resistor, $V_{REF}$ is set equal to the voltage at terminal 57 when current $I_t$ passes through resistor 56. Then when the voltage at terminal 57 is equal to $V_{REF}$, comparator 58 causes both transistors 52 and 54 to conduct. Transistor 52 removes base drive from transistor 42 so that it becomes nonconductive, therefore reducing voltage at terminal 57 such that comparator 58 turns "off" and, in turn, transistors 52 and 54 are turned "off". At the same time, a voltage is induced in winding 38a due to reversal of primary voltage such that junction of winding 38a and resistor 50 is positive relative to circuit ground. This relatively positive voltage provides sufficient base current to turn "off" transistor 44 whereupon the above-described action with respect to transistor 42 is repeated with respect to transistor 44.

The DC-to-DC converter described thus far, operates properly unless a short occurs in load 80. When short occurs, it is not completely reflected back to the primary winding 34 to thereby cause comparator 30 to shut down switching regulator 12 due partially to winding resistance of windings 34 and 66, impedances of diodes 70 and 72 and due more particularly to imperfect transformer coupling. As a result of the resistances, impedances and imperfect coupling, the converter undesirably does not shut down. Moreover, the threshold circuit comprising components 52, 54, and 58, which normally limits the peak currents at core saturation, under shorted output conditions causes the converter to change polarity at a very high rate (that is the converter frequency will increase greatly). By limiting the peak current to a level $I_t$ (FIG. 2, waveforms $I_1$ and $I_2$), the overcurrent circuit comprising components 12, 22, and 30, will not be subject to overcurrent and therefore will not shut down the circuit. Therefore, an excessive amount of power will be dissipated in transistors 42 and 44 and in the output rectifiers 70 and 72 as long as short of load 80 continues.

In accordance with the invention, the increase in frequency of switching of transistors 42 and 44 is detected by the circuit within block 10. The value of capacitor 82 and that of resistor 84 are chosen such that the RC time constant below the period of the converter switching frequency when the converter output is shorted and far above the converter switching frequency when operating normally. Under normal non-shorted conditions, the circuit within block 10 has only a slight effect on the overcurrent sense level and this effect can be negated by choosing a different value of resistor 22. However, when load 80 is shorted, with the associated increase in converter frequency, the impedance presented by the resistor 84 and capacitor 82 decreases such that enough additional energy is transferred through diode 86 to terminal 30b to establish a difference in potential at terminals 30a and 30b that, in turn, produces a signal to switching regulator 12 via device 30 to disable regulator 12 or otherwise limit or cut "off" the current at terminal 20. This will therefore reduce or eliminate the dissipation in transistors 42, 44 and rectifiers 70 and 72.

It will understood that other suitable frequency determining means than that illustrated in block 10 may be utilized, and that the output signal from the frequency detecting means may be utilized in any suitable way to shut down the converter or to otherwise reduce voltage and current levels produced by the converter to safe values upon the converter being shorted.

Further although FIG. 1 is known as a fullwave converter or squarewave converter employing a centertapped primary winding 34, fullwave converters of the half bridge or full bridge type are also known which do not employ a centertapped primary but which have switching transistors where the switching frequency is related to the output current and therefore can make use of the instant invention. Further voltage converters called flyup converters or foreward converters which typically employ only one switching transistor or other switching means coupled to a non-centertapped primary winding can also make use of the invention. In FIG. 1, the voltage produced at secondary winding 66 of transformer 40 is converted to DC by diodes 70 and 72 although no conversion to DC is necessary to practice this invention.

What is claimed is:

1. In a voltage conversion circuit responsive to an input DC voltage for providing an output voltage to a load, said circuit being of the type including a transformer having a primary winding and a secondary winding, said secondary winding producing said output voltage, said circuit further including a switching means responsive to a control signal for applying said input voltage across said primary winding for producing a current therein which increases as a function of time, the rate of said increase being a function of the impedance of said load, and means responsive to the instantaneous value of said current in said primary winding exceeding a preselected value for providing said control signal to said switching means, wherein the improvement comprises:

frequency responsive means coupled to said switching means for sensing the switching frequency thereof and responsive to a frequency in excess of a given rate for causing the decrease of said input DC voltage to said primary winding.

2. The combination as set forth in claim 1, wherein said frequency responsive means comprises a series resistor and capacitor network.

3. The combination as set forth in claim 2, further including a switching regulator for producing an input voltage, a current sensing and control means for sensing the current produced by said switching regulator and responsive to current in excess of a preselected value for causing said regulator to reduce the value of said input voltage and wherein said resistor and capacitor network is responsive to said frequency in excess of a given rate for providing a signal to said current sensing means indicative of a current in excess of said preselected value.

4. The combination as set forth in claim 3 wherein said frequency responsive means comprises a first diode means having a first terminal coupled to said current sensing and control means and a second terminal coupled to said network for rectification of current received therefrom.

5. The combination as set forth in claim 4 wherein said frequency responsive means further comprises second diode means having a first terminal coupled to said first diode means second terminal and a second terminal coupled to circuit ground for clamping the current of said network.

* * * * *